No. 846,870. PATENTED MAR. 12, 1907.
C. SOMERS.
BORING MACHINE.
APPLICATION FILED MAR. 22, 1906.
2 SHEETS—SHEET 1.
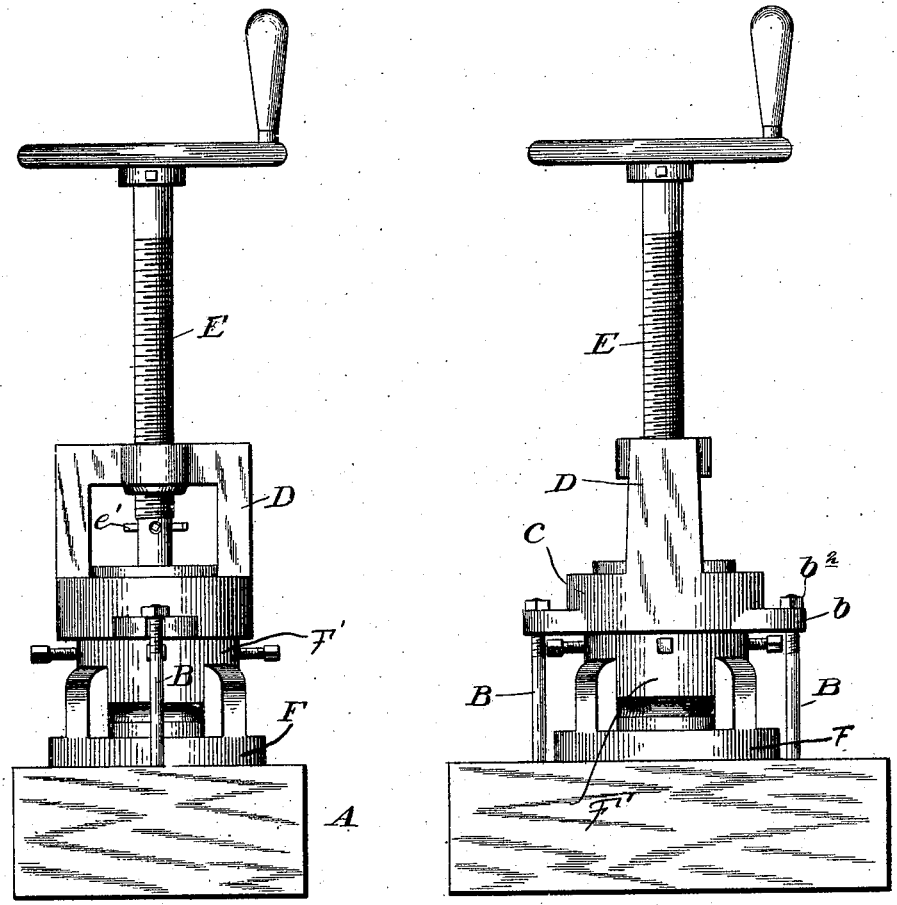
Fig. 1.   Fig. 2.
Fig. 3.
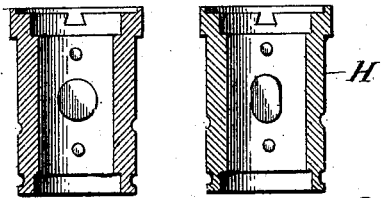
Witnesses
W. H. Ourand
L. E. Barkley
Inventor
Carl Somers
By Frank S. Ahhuman,
Attorney.

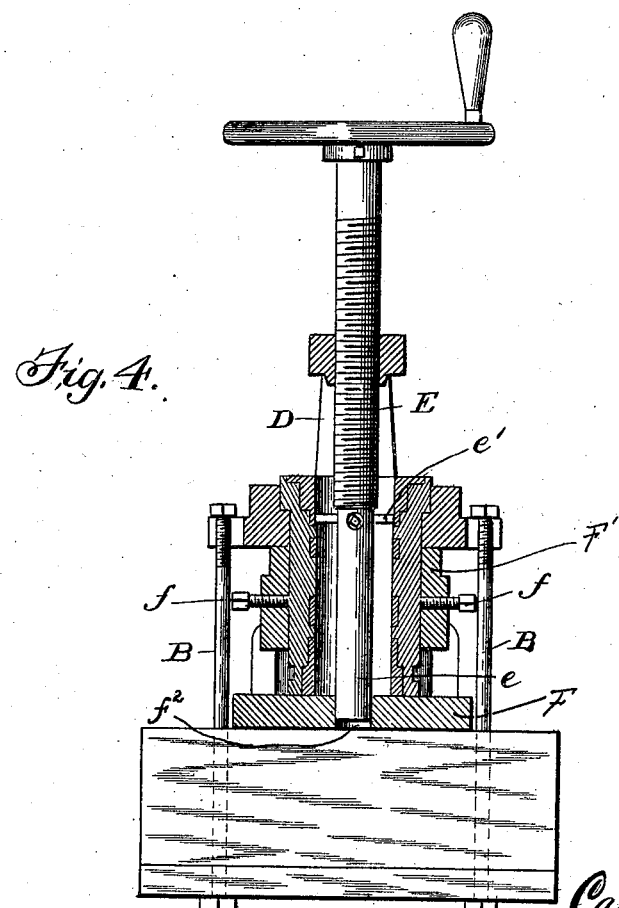

UNITED STATES PATENT OFFICE.

CARL SOMERS, OF FAIRMONT, WEST VIRGINIA.

BORING-MACHINE.

No. 846,870.     Specification of Letters Patent.    Patented March 12, 1907.

Application filed March 22, 1906. Serial No. 307,496.

*To all whom it may concern:*

Be it known that I, CARL SOMERS, a citizen of the United States of America, residing at Fairmont, in the county of Marion and State of West Virginia, have invented certain new and useful Improvements in Boring-Machines, of which the following is a specification.

This invention relates to metal-working tools, and more particularly to an equipment designed for the purpose of relining and reshaping armature-shaft, main-shaft, or other bearings for the performance of like functions.

It is an object of this invention to provide a device of this character which will prove simple in construction, efficient in practice, and comparatively inexpensive to manufacture.

With the foregoing and other objects in view the invention consists in the details of construction and in the arrangement and combination of parts to be hereinafter more fully set forth and claimed.

Figure 1 is a side view in elevation of the device assembled for operation in boring the lining of a journal-box. Fig. 2 is a similar view taken at right angles to that of Fig. 1. Fig. 3 is a sectional view showing portions of the journal-boxes to be bored. Fig. 4 is a sectional view taken on the line 4 4 of Fig. 1.

In the drawings, A denotes a suitable platform comprising beams suitably separated to form a space of such width as to receive the depending portion of the cutting-stem, (to be hereinafter described,) said platform having two upwardly-extending anchoring-bolts B, which engage lugs $b$ on the head C of the boring apparatus, the said head having a yoke D, which is threaded to receive the feed-screw E of the boring apparatus.

A base F is stationed on the platform and is provided with upwardly-extending arms which engage a wing F'. This wing has a bore of such diameter as to receive journal-boxes, and said ring is provided with transverse clamping-screws $f$, threaded through the wall thereof and designed to clamp the two sections of the journal-box in position within the ring. It is to be observed that the base F, the upright arms, and the ring F' are formed integral. This ring, together with the clamping-screws, is utilized for the purpose of holding the journal-boxes to be bored.

When the journal-box H or the lining thereof is to be bored, the head C is applied to the ring with the bolts B engaging the lugs $b$. The nuts $b^2$ are then run on the threaded nuts of the bolts B, and the head is thus clamped in place. The yoke portion of the head is threaded, as stated, to receive the feed-screw E, said feed-screw E terminating in a stem $e$, which carries one or more cutters $e'$. The stem, as stated, is of such size as to feed within the opening $f^2$ in the bottom of the ring and is guided thereby, thus insuring a uniform action of the cutters on the lining. The cutters are preferably adjustable transversely of the stem, and, if desired, a great number of such cutters may be utilized.

Having thus fully described my invention, what I claim as new, and desire to secure by Letters Patent, is—

In a metal-working apparatus, a base having an apertured bottom, upwardly-extending arms on the base, a ring carried by the arms, a platform in which the base is supported, means for clamping an object in the ring, a head engaging the ring, means engaging the platform and head for holding the head to the ring and for holding the ring and base to the platform, a threaded yoke carried by the head, a feed-screw threaded in the yoke, a stem on the feed-screw and cutter-blades carried by the stem.

In testimony whereof I affix my signature, in the presence of two witnesses, this 10th day of November, 1905.

CARL SOMERS.

Witnesses:
 H. H. STAGGERS,
 SAM'L H. BUTCHER.